United States Patent

[11] 3,587,891

| | | |
|---|---|---|
| [72] | Inventor | Frank Stadelman<br>Cranford, N.J. |
| [21] | Appl. No. | 759,288 |
| [22] | Filed | Sept. 12, 1968 |
| [45] | Patented | June 28, 1971 |
| [73] | Assignee | Latendorf Conveying Corporation<br>Kenilworth, N.J. |

[54] TRANSFER APPARATUS
4 Claims, 4 Drawing Figs.

[52] U.S. Cl. .................................................. 214/309,
137/505.47, 214/1, 294/65
[51] Int. Cl. ..................................................... B65g 69/00
[50] Field of Search ........................................... 214/309, 1
(BS), 1 (BS2), 1 (BS3), 1 (BS4), 8.5 (D); 294/65;
137/505.47

[56] References Cited
UNITED STATES PATENTS

| | | | |
|---|---|---|---|
| 2,927,707 | 3/1960 | Reed .............................. | 214/309 |
| 3,423,119 | 1/1969 | Stanley .......................... | 294/65 |
| 2,854,990 | 10/1958 | Grandberg .................... | 137/505.47X |
| 3,325,025 | 6/1967 | Irving ............................. | 214/309 |

*Primary Examiner*—Gerald M. Forlenza
*Assistant Examiner*—George F. Abraham
*Attorney*—Seidel and Gonda

ABSTRACT: Transfer apparatus is provided with a means of maintaining the degree of vacuum in the transfer conveyor housing uniform at any desired preset value.

INVENTOR
FRANK STADELMAN
BY
Seidel & Gonda
ATTORNEYS.

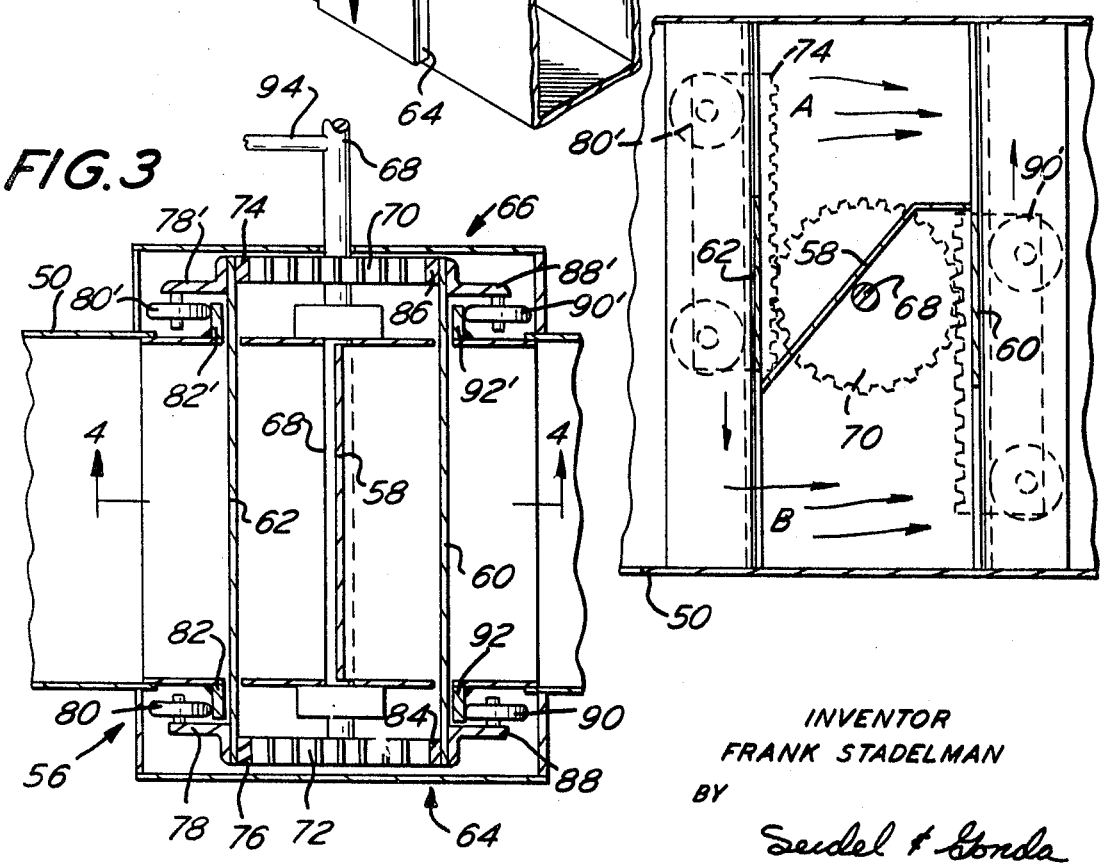
INVENTOR
FRANK STADELMAN
BY
Seidel & Gonda
ATTORNEYS.

TRANSFER APPARATUS

This invention relates to apparatus for transferring an article from one place to another. This invention has specific application to a depanning apparatus which may be provided with delidding means if desired. The depanning apparatus of the present invention is of the type disclosed in my prior U.S. Pat. No. 3,057,497.

Large loaves of bread require a greater vacuum in the depanning conveyor housing as compared with small loaves and/or rolls. If the vacuum is too high for the particular type of product being depanned, it has been noticed that the vacuum will withdraw air from the bread product thereby making the same more dense. In order to prevent the removal of air from the bread product, the vacuum in the depanning conveyor housing must be preset at a desired value and maintained. When the depanning conveyor is empty and not operating, it can be preset so that the vacuum in the housing is at a value such as 8 ounces. When the conveyor is full and operating, the vacuum increases to 12 ounces.

In order to prevent the removal of air from the bread product, it would be necessary to use a vacuum pump means having a capacity of two to three times the present vacuum pump means and provide expensive controls for the same. This problem has been solved by me in a manner which is simple, inexpensive and reliable. In accordance with the present invention, a valve means is provided between the vacuum pump means and the depanning conveyor housing to cutdown the flow rate as the degree of vacuum tends to increase. The valve means is provided with an external adjustable control depending upon the desired vacuum and is correlated or responsive to the actual vacuum by a feedback means.

It is an object of the present invention to provide a novel transfer apparatus.

It is another object of the present invention to provide a depanning apparatus wherein the degree of vacuum in the depanning conveyor housing may be maintained uniform at a desired preset level.

It is another object of the present invention to provide a depanning apparatus wherein the flow rate from the depanning conveyor housing by a vacuum pump means is selectively controllable without being subject to undue maintenance as a result of dust, sesame seeds and other particles which flow through the depanning conveyor housing to the vacuum pump means.

Other objects will appear hereinafter.

For the purpose of illustrating the invention there is shown in the drawings a form which is presently preferred; it being understood, however, that this invention is not limited to the precise arrangements and instrumentalities shown.

FIG. 2 is a partial perspective view of the flow conduit and controls associated therewith for controlling the degree of vacuum in the depanning conveyor housing.

FIG. 3 is a sectional view taken along the line 3-3 in FIG. 2.

FIG. 4 is a sectional view taken along the line 4-4 in FIG. 3.

Figure 1:
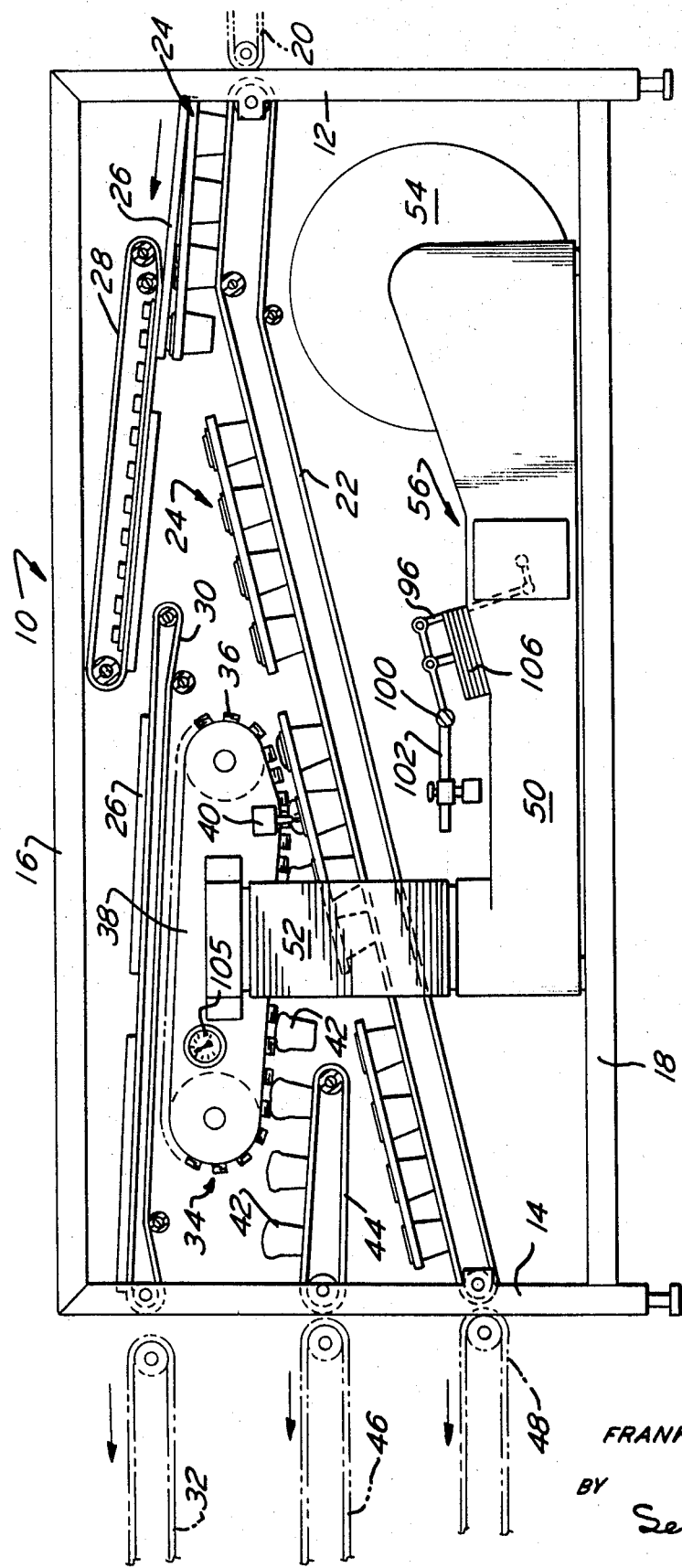
FIG. 1 is a side elevation view of the depanning apparatus of the present invention.

Referring now to the drawings in detail, wherein like numerals indicate like elements, there is shown in FIG. 1 a depanning and delidding apparatus designated generally as 10. The apparatus 10 as illustrated in FIG. 1 is similar to the above-mentioned patent. The apparatus 10 includes a frame having rectangular end frames 12 and 14 interconnected by pairs of top beams 16 and bottom beams 18.

Pan straps 24 are delivered by conveyor 20 from the baking apparatus to the apparatus 10 and received by a feed conveyor 22. Feed conveyor 22 has a generally horizontal portion at its receiving end with the remainder of the conveyor 22 being inclined downwardly.

The pan straps 24 are provided with a lid, such as lid 26, the lids will be removed by a magnetic delidding conveyor 28. The conveyor 28 transfers the lids 26 to a conveyor 30 which in turn delivers them to a conveyor 32 for removal in a direction away from the apparatus 10.

The delidded pan straps 24 then travel down the incline portion of the conveyor 22 toward the depanning conveyor 34. The depanning conveyor 34 may be of a type disclosed in my above-mentioned patent. Alternatively, the depanning conveyor 34 may be of the type disclosed in U.S. Pat. No. 3,170,581 wherein the conveyor belt is provided with a plurality of rows of bellows members 36 which are shown in FIG. 5 of said patent. To assist in depanning of bread loaves 42 from the pan strap, a nozzle 40 may be utilized in a manner which is conventional in the art.

Loaves of bread 42 which are removed from the pan strap are transferred from the depanning conveyor 34 to a receiving conveyor 44 which in turn transfers the bread loaves to a delivery conveyor 46. The transfer from depanning conveyor 34 to receiving conveyor 44 may result from a decrease in pressure as shown in U.S. Pat. No. 3,057,497. Alternatively, the transfer may take place as shown in U.S. Pat. No. 3,170,581. Conveyor 46 delivers the bread to the wrapping machines. The empty pan straps continue down the incline portion of the feed conveyor 22 and are transferred to a delivery conveyor 48. Conveyor 48 delivers the empty pan straps to washing equipment so that the pan straps may be reused.

The depanning conveyor 34 is provided with a vacuum housing 38. Each of the bellows members 36 communicate with the evacuated interior of housing 38. Housing 38 is evacuated by means of a vacuum pump means 54. Vacuum pump means 54 communicates with housing 38 by way of conduit 50 and a bellows section 52.

A valve means is provided in conduit 50 for controlling the rate of flow therethrough so that the vacuum in housing 38 may be maintained substantially constant within an acceptable operating range.

Referring particularly to FIGS. 3 and 4, the valve means 56 includes a stationary partition 58 extending traversely across the conduit 50. Reciprocal gate valve members 60 and 62 are provided. As illustrated in FIG. 4, the valve means 56 is in its wide open position wherein there are two flow paths designated as A above partition 58 and as B below partition 58. Valve member 60 is adapted to move upwardly and cooperate with the upper end of partition 58 to close off flow through flow path A. Valve member 62 is adapted to move downwardly and cooperate with the lower end of partition 58 to control flow through flow path B.

In order to maintain the operating mechanisms for the valve means 56 free from dust, sesame seeds and other particles, external housings 64 and 66 are provided. See FIG. 3. The housings are U-shaped and cooperate with removable panels forming a part of the wall conduit 50.

A shaft 68 extends through the housings 64 and 66 and through conduit 50 adjacent to the partition 58. The shaft 68 is suitably journaled within the housings 64 and 66. A gear 70 is fixedly secured to shaft 68 within the housing 66. A similar gear 72 is fixedly secured to shaft 68 within housing 64.

A rack 74 is fixedly secured to one end of gate valve member 62. It will be noted that member 62 extends across the conduit 50 and into the housings 64 and 66. See FIG. 3. A rack 76 is secured to the member 62 within the housing 64. Rack 74 is meshed with gear 70 and rack 76 is meshed with gear 72.

Means are provided within the housings 64 and 66 for guiding the gate valve member 62 so that it reciprocates in a vertical direction. The guiding means at each end of the member 62 is identical. Hence, only one guide means will be described in detail with corresponding prime numerals being provided for the structure at the other end.

As shown more clearly in FIG. 3, a bracket 76 is fixedly secured to the gate valve member 62 on a surface opposite from the rack 76 within housing 64. A pair of wheels 80 are rotatably supported by the bracket 78. The wheels 80 ride on a vertical track 82. Track 82 is fixedly secured to a removable panel forming a part of the wall of conduit 50.

Gate valve member 60 is provided with a rack 84 meshed with gear 72 in housing 64 and a rack 86 meshed with gear 70 within the housing 66. Gate valve member 60 is likewise provided with a guiding means within each of the housings 64 and 66. Only the guiding means in housing 64 will be described in detail with corresponding prime numerals being provided on the structure within housing 66. Thus, a bracket 88 is secured to the edge portion of member 60 within housing 64. A pair of wheels 90 are rotatably supported by the bracket 88 and ride on a vertically disposed track 92. Track 92 is similarly secured to removable panels of the walls of the conduit 50.

As shown more clearly in FIG. 2, an actuator rod 94 is fixedly secured to shaft 68 and extends radially therefrom The free end of rod 94 is pivotably connected to one end of a link 96. The other end of link 96 is pivotably connected to the free end of an actuator rod 98. Rod 98 is fixedly secured to a shaft 100. Shaft 100 extends parallel to shaft 68.

A lever arm 102 is fixedly secured to shaft 100. A weight 104 is adjustably positioned along the length of lever arm 102. Lever arm 102 is preferably inclined with respect to the horizontal by an angle of approximately 10° to 12°. Weight 104 is adjustably positioned so as to obtain the desired vacuum within housing 38. The actual pressure within housing 38 may be read on the gauge 105. Graduations are preferably provided along the length of lever arm 102.

A feedback of the actual pressure within the conduit 50 upstream of the valve means 56, and consequently the actual pressure within housing 38 is provided. The feedback includes a bellows 106 having one surface exposed to the pressure within conduit 50. The bellows 106 is provided with a rod 108 pivotably coupled to the free end of an actuator rod 110. Rod 110 is fixedly secured to shaft 100.

The operation of the apparatus 10 is as follows.

If the pan straps 24 are provided with lids, the lids will be removed by conveyor 28 as described above. The bread products will be removed from the pan straps 24 by means of the depanning conveyor 34. The desired vacuum within housing 38 may be preset by positioning the weight 104 along the length of lever arm 102. Movement of weight 104 in a direction away from shaft 100 rotates shaft 100 to thereby rotate shaft 68 in an opposite direction. Thus, counterclockwise rotation of shaft 100 in FIG. 1 results in clockwise rotation of shaft 68 in FIG. 1.

Clockwise rotation of shaft 68 in FIG. 1 moves the gate valve members 60 and 62 to their open position. When the degree of vacuum exceeds the predesired value, bellows 106 will be pulled downwardly by the vacuum in conduit 50 and thereby rotate shaft 100 in a clockwise direction. The result of such rotation imparts a counterclockwise rotation of shaft 68 which in turn causes a corresponding amount of closure of the gate valve members 60 and 62.

Hence, as the vacuum decreases below the desired value, the effect of the weight 104 increases to open the valve means 56 wider. As the vacuum increases beyond a predetermined value, the bellows 106 closes the valve means 56 to the desired degree. The entire control means for the valve means 56 is automatic after an initial presetting of the weight 104. Hence, the degree of vacuum in the housing 38 remains substantially constant regardless of whether the conveyor 34 is full or empty. When changing from large loaves of bread to small bread rolls, it is only necessary to reposition weight 104.

Minimum maintenance of the moving parts will be required due to the fact that the parts are within the housings 64 and 66 outside of the main flow stream of air containing dust, sesame seeds, etc. Because the valve members 60 and 62 are vertically disposed gate valve members operated by a rack and gear arrangement, the gate valve members do not tend to be closed by the vacuum as the gate valve members approach their closed position.

The apparatus as described above more uniformly depans bread and other related bread products without removing air from the bread products which had the disadvantage of causing the bread products to shrink when cooled.

Hereinafter, the conveyor 34 may be referred to as a conveyor means for vacuum depanning breadlike products and transferring them to the delivery conveyor 44. Hereinafter, the valve means 56 and its associated controls as shown more clearly in FIG. 2 may be referred to as a means for maintaining the vacuum in the housing 38 substantially constant during operation of the conveyor means 34.

The present invention may be embodied in other specific forms without departing from the spirit or essential attributes thereof and, accordingly, reference should be made to the appended claims, rather than to the foregoing specification as indicating the scope of the invention. For instance, the concept of vacuum transfer from one conveyor to another need not be restricted to a depanning operation.

I claim:

1. Apparatus comprising a depanning housing having a conveyor means for vacuum depanning breadlike products and transferring them to a conveyor, a conveyor for receiving breadlike products from said conveyor means, a vacuum pump means connected to said housing for evacuating the same, and means for maintaining the vacuum in said housing substantially constant during operation of said conveyor means, said vacuum maintaining means including an adjustable valve means movable in a range between substantially open and substantially closed positions for controlling the flow from said housing to said vacuum pump means, said valve means including a gate valve member disposed within said conduit and movable in a direction transverse to the direction of flow through said conduit, a rack and pinion actuator for said gate valve member disposed outside said conduit, wheel guide means for said gate valve member disposed outside said conduit, and feedback means in said conduit for moving said gate valve member in a transverse direction in response to pressure variation in said conduit.

2. Apparatus in accordance with claim 1 wherein said pinion is fixedly secured to a shaft, said shaft being coupled by actuator arms and a link to a second shaft, said second shaft having a lever arm on which is mounted an adjustable weight, and a bellows responsive to the pressure in said conduit pivotably coupled to said second shaft.

3. Article transfer apparatus comprising a transfer housing, said transfer housing having conveyor means connected thereto, a conveyor for receiving an article from said conveyor means, a vacuum pump means connected to said housing by a conduit for evacuating said housing and means for maintaining the vacuum in said housing substantially constant during operation of said conveyor means, said vacuum maintaining means including valve means in said conduit, said valve means being movable and arranged between substantially open and substantially closed positions in response to increases and decreases in the pressure in said conduit between said valve means and said housing, said valve means including a pair of movable gate valve members and a stationary partition in said housing, said gate valve members cooperating with said stationary partition to control flow through said conduit, and actuator means for said gate valve members disposed externally of said conduit.

4. Article transfer apparatus in accordance with claim 3 wherein said gate valve members are mounted for slidable movement with respect to said stationary partition.